(12) United States Patent
Kaneko et al.

(10) Patent No.: US 11,094,949 B2
(45) Date of Patent: Aug. 17, 2021

(54) FUEL CELL SYSTEM

(71) Applicant: TOYOTA JIDOSHA KABUSHIKI KAISHA, Toyota (JP)

(72) Inventors: Tomohiko Kaneko, Okazaki (JP); Masayuki Ito, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 71 days.

(21) Appl. No.: 16/718,402

(22) Filed: Dec. 18, 2019

(65) Prior Publication Data

US 2020/0203739 A1 Jun. 25, 2020

(30) Foreign Application Priority Data

Dec. 25, 2018 (JP) .............................. JP2018-241433

(51) Int. Cl.
*H01M 8/043* (2016.01)
*H01M 8/0438* (2016.01)
*H01M 8/04537* (2016.01)
*H01M 8/04746* (2016.01)

(52) U.S. Cl.
CPC ... *H01M 8/04395* (2013.01); *H01M 8/04552* (2013.01); *H01M 8/04582* (2013.01); *H01M 8/04776* (2013.01); *H01M 2250/20* (2013.01)

(58) Field of Classification Search
CPC ......... H01M 8/04395; H01M 8/04552; H01M 8/04582; H01M 8/04776
USPC ....................................................... 429/432
See application file for complete search history.

(56) References Cited

U.S. PATENT DOCUMENTS

| | | | |
|---|---|---|---|
| 2012/0088171 A1* | 4/2012 | Edmiston ............ | H01M 8/0494 429/429 |
| 2016/0006059 A1* | 1/2016 | Kwon ...................... | B60L 1/00 429/434 |
| 2016/0141682 A1 | 5/2016 | Yamanaka et al. | |
| 2016/0141905 A1* | 5/2016 | Yamanaka ............. | B60L 50/52 320/135 |
| 2017/0047602 A1* | 2/2017 | Sato ................... | H01M 8/04753 |
| 2017/0104231 A1* | 4/2017 | Jomori .............. | H01M 8/04902 |

FOREIGN PATENT DOCUMENTS

| | | |
|---|---|---|
| JP | 2003-536232 A | 12/2003 |
| JP | 2008-130402 | 6/2008 |
| JP | 2012-185968 | 9/2012 |
| KR | 10-2016-0058681 A | 5/2016 |
| WO | WO 01/99218 A1 | 12/2001 |

* cited by examiner

*Primary Examiner* — James M Erwin
(74) *Attorney, Agent, or Firm* — Finnegan, Henderson, Farabow, Garrett & Dunner, LLP

(57) ABSTRACT

A fuel cell system includes: a fuel cell; a supply device; and a control unit configured to lower output voltage of the fuel cell to a target value so as to execute recovery processing to recover power generation performance of the fuel cell. In a case of having an execution request of the recovery processing, the control unit restarts power generation of the fuel cell when open circuit voltage of the fuel cell is lowered to or smaller than a threshold value higher than the target value by controlling a flow rate of a cathode gas while the power generation of the fuel cell is paused, and the control unit executes the recovery processing while controlling an output current value of the fuel cell to be smaller than an idle current value that is an output current value of the fuel cell in an idle operation state.

8 Claims, 11 Drawing Sheets

COMPARATIVE EXAMPLE

COMPARATIVE EXAMPLE

COMPARATIVE EXAMPLE

COMPARATIVE EXAMPLE

FIG. 4A
PRESENT EMBODIMENT
FIG. 4B
PRESENT EMBODIMENT
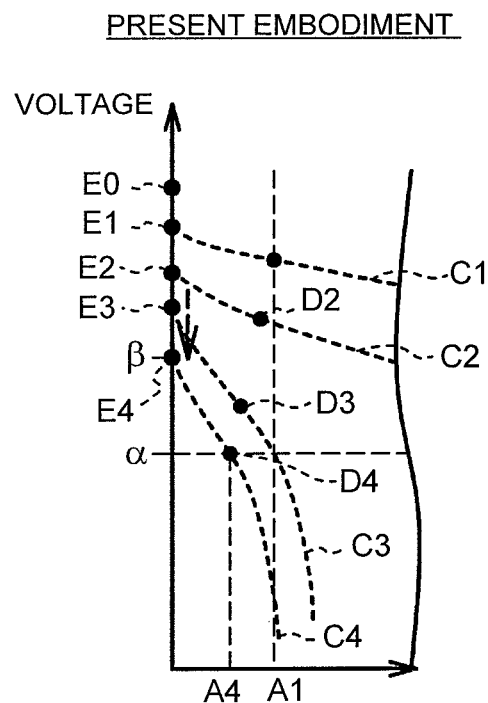
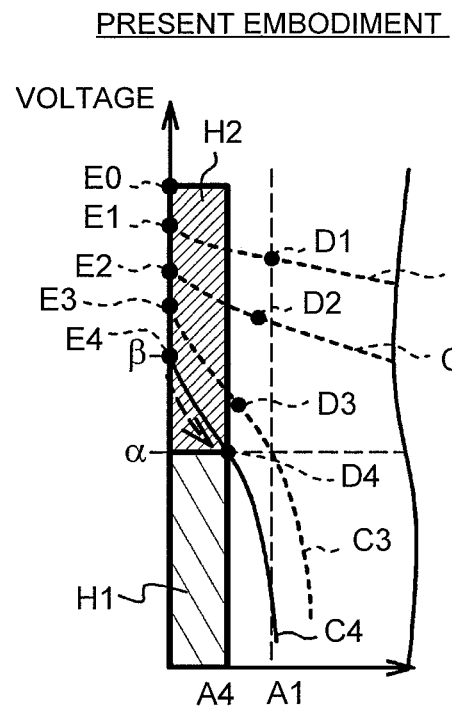

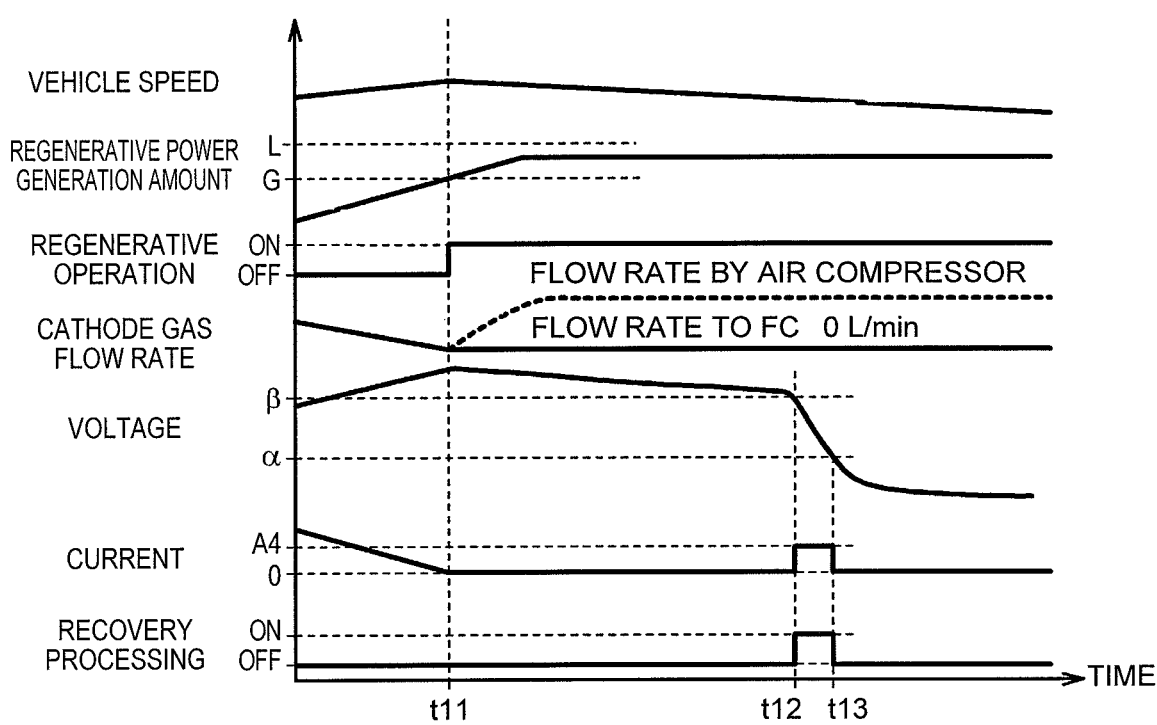

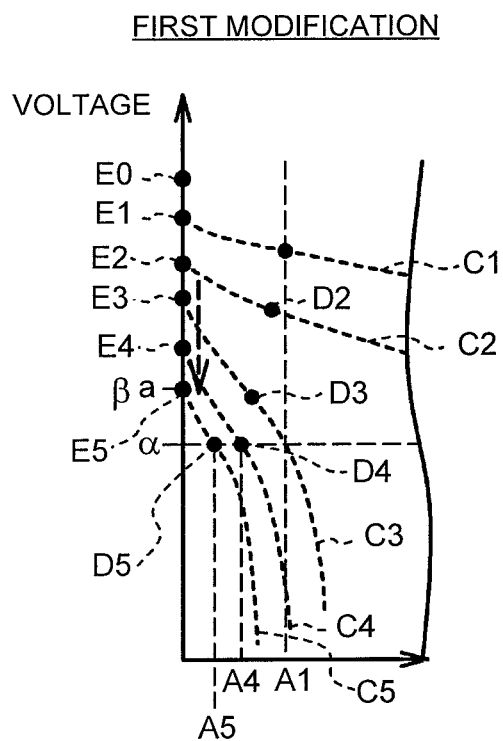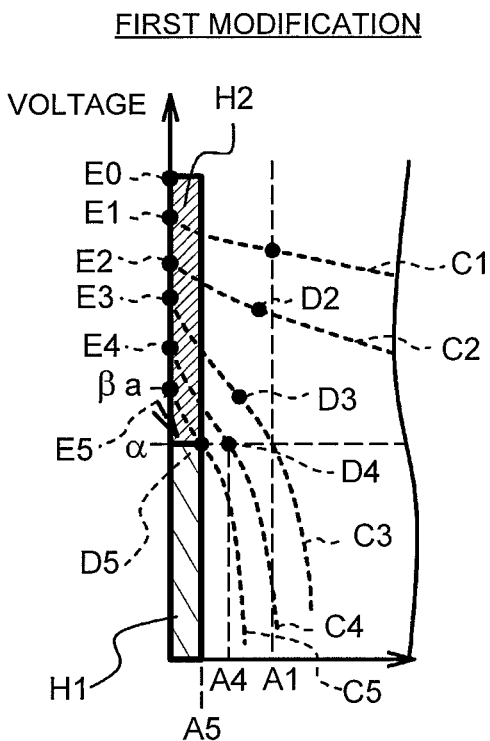
FIG. 8A  
FIRST MODIFICATION
FIG. 8B  
FIRST MODIFICATION

SECOND MODIFICATION

FUEL CELL SYSTEM

INCORPORATION BY REFERENCE

The disclosure of Japanese Patent Application No. 2018-241433 filed on Dec. 25, 2018 including the specification, drawings and abstract is incorporated herein by reference in its entirety.

BACKGROUND

1. Technical Field

The present disclosure relates to a fuel cell system.

2. Description of Related Art

In some cases, recovery processing for recovering power generation performance of a fuel cell is performed by lowering voltage of the fuel cell to a predetermined target value (for example, see Japanese Patent Application Publication No. 2008-130402).

SUMMARY

In the process in which the voltage of the fuel cell is lowered to the target value as described above, since power generation and heat generation are both continued in the fuel cell, the power generation amount and the heat generation amount are increased. Consequently, surplus electric power is increased and the fuel cell may have a high temperature.

The present disclosure provides a fuel cell system capable of executing recovery processing for recovering power generation performance of a fuel cell while decreasing the power generation amount and the heat generation amount.

According to one aspect of the present disclosure, provided is a fuel cell system. This fuel cell system includes: a fuel cell; a supply device configured to supply a cathode gas to the fuel cell and adjust a flow rate of the cathode gas supplied to the fuel cell; and a control unit configured to lower output voltage of the fuel cell to a target value so as to execute recovery processing to recover power generation performance of the fuel cell. The control unit is configured to, in a case of having an execution request of the recovery processing, i) restart power generation of the fuel cell when open circuit voltage of the fuel cell is lowered to or smaller than a threshold value higher than the target value by controlling the flow rate of the cathode gas while the power generation of the fuel cell is paused, and ii) execute the recovery processing while controlling an output current value of the fuel cell to be smaller than an idle current value that is an output current value of the fuel cell in an idle operation state.

According to the fuel cell system in the above aspect, since the power generation is restarted to execute the recovery processing when the open circuit voltage is lowered to or smaller than the threshold value, the output voltage can be lowered to the target value with a smaller power generation amount and a smaller heat generation amount. Furthermore, since the recovery processing is executed by controlling the output current value of the fuel cell to be smaller than the idle current value, the output voltage can be lowered to the target value with a smaller power generation amount and a smaller heat generation amount.

In the fuel cell system in the above aspect, an output current value of the fuel cell may be smaller than the idle current value, the output current value corresponding to the target value and determined by current-voltage characteristics of the fuel cell corresponding to the threshold value.

In the fuel cell system in the above aspect, the control unit may be configured to execute the recovery processing by restarting power generation of the fuel cell so as to increase the output current value of the fuel cell within a range in which the output current value is smaller than the idle current value, and then decreasing the output current value.

In the fuel cell system in the above aspect, the control unit may be configured to execute the recovery processing while limiting the flow rate of the cathode gas to or less than a flow rate of the cathode gas at which the open circuit voltage becomes lowered.

In the fuel cell system in the above aspect, the control unit may be configured to execute the recovery processing while setting the flow rate of the cathode gas to zero.

In the fuel cell system in the above aspect, the control unit may be configured to, when a request output to the fuel cell is equal to or smaller than a predetermined value, execute an intermittent operation for pausing the power generation of the fuel cell and controlling increase and decrease of the flow rate of the cathode gas so as to converge the open circuit voltage within a target range; the threshold value is within the target range; and the control unit may be configured to, during the intermittent operation in a case of having the execution request of the recovery processing, stop the intermittent operation and execute the recovery processing when the open circuit voltage is lowered to or smaller than the threshold value.

In the fuel cell system in the above aspect, the control unit may be configured to, when a request output to the fuel cell is equal to or smaller than a predetermined value, execute an intermittent operation for pausing the power generation of the fuel cell and controlling increase and decrease of the flow rate of the cathode gas so as to converge the open circuit voltage within a target range; the threshold value is smaller than a lower limit value of the target range; and during the intermittent operation in a case of having the execution request of the recovery processing, the control unit may not increase the flow rate of the cathode gas so as to increase the open circuit voltage even when the open circuit voltage is lowered to the lower limit value, and may stop the intermittent operation and execute the recovery processing when the open circuit voltage is lowered to or smaller than the threshold value.

In the fuel cell system in the above aspect, the fuel cell system may be mounted in a vehicle, and the supply device may include: a compressor configured to supply the cathode gas to the fuel cell; and a switching mechanism configured to switch a state from a supply state to a bypass state, the cathode gas being supplied from the compressor to the fuel cell in the supply state, the fuel cell being bypassed in the bypass state such that the cathode gas is not supplied to the fuel cell and discharged to an outside of the fuel cell. The control unit may be configured to, when a regenerative power amount of a power generator mounted in the vehicle is equal to or greater than a predetermined value, execute a regenerative operation for switching the state from the supply state to the bypassing state and pausing the power generation of the fuel cell while consuming the regenerative power of the power generator by driving of the compressor. The control unit may be configured to, during the regenerative operation in a case of having the execution request of the recovery processing, execute the recovery processing while continuing the regenerative operation when the open circuit voltage is lowered to or smaller than the threshold value.

According to the fuel cell system in the above aspect, it is possible to provide a fuel cell system capable of executing the recovery processing that recovers the power generation performance of the fuel cell while decreasing the power generation amount and the heat generation amount.

BRIEF DESCRIPTION OF THE DRAWINGS

Features, advantages, and technical and industrial significance of exemplary embodiments of the disclosure will be described below with reference to the accompanying drawings, in which like numerals denote like elements; and wherein:

FIG. 4A is an explanatory diagram of recovery processing of the present embodiment;

FIG. 4B is an explanatory diagram of the recovery processing of the present embodiment;

FIG. 7 is a timing chart when the recovery processing is executed during a regenerative operation;

FIG. 8A is an explanatory diagram of recovery processing according to a first modification;

FIG. 8B is an explanatory view of the recovery processing of the first modification;

DETAILED DESCRIPTION OF EMBODIMENTS

Configuration of Fuel Cell System

Figure 1:
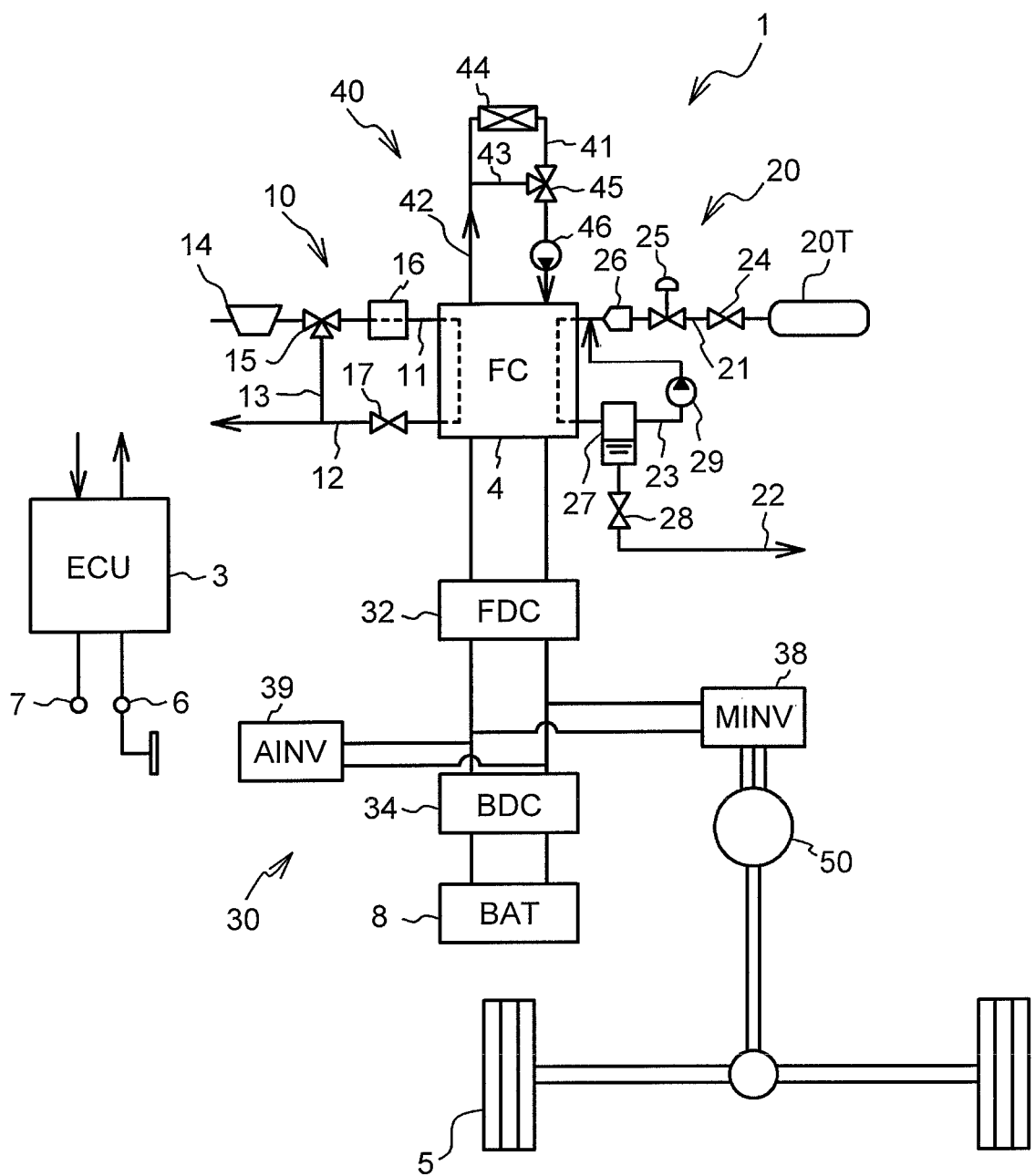
FIG. 1 is a configuration diagram of a fuel cell system mounted in a vehicle.

FIG. 1 is a configuration diagram of a fuel cell system 1 mounted in a vehicle. The fuel cell system 1 includes: an ECU (electronic control unit) 3; a fuel cell (hereinafter, referred to as an FC) 4; a rechargeable battery (hereinafter, referred to as a BAT) 8; a cathode gas supply system 10; an anode gas supply system 20; a power control system 30; and a cooling system 40. The fuel cell system 1 includes a cooling system (not shown) that cools the FC 4 by circulating cooling water. Further, the vehicle includes a motor 50 for traveling, wheels 5, and an accelerator opening sensor 6.

The FC 4 is a fuel cell generating electricity by receiving supply of a cathode gas and an anode gas, and is configured by stacking a plurality of solid polymer electrolyte type single cells.

The cathode gas supply system 10 (supply device) supplies air containing oxygen as the cathode gas to the FC4, and includes: a supply pipe 11; a discharge pipe 12; a bypass pipe 13; an air compressor 14 (compressor); a bypass valve 15; an intercooler 16; and a back pressure valve 17. The supply pipe 11 is connected to a cathode inlet manifold of the FC 4. The discharge pipe 12 is connected to a cathode outlet manifold of the FC 4. The bypass pipe 13 communicates the supply pipe 11 and the discharge pipe 12 with each other. The bypass valve 15 is provided at a connection part between the supply pipe 11 and the bypass pipe 13. The bypass valve 15 switches a communication state between the supply pipe 11 and the bypass pipe 13. The air compressor 14, the bypass valve 15, and the intercooler 16 are arranged on the supply pipe 11 in this order from the upstream side. The back pressure valve 17 is disposed on the discharge pipe 12 and located more upstream than the connection part between the discharge pipe 12 and the bypass pipe 13. The air compressor 14 supplies air containing oxygen as the cathode gas to the FC 4 via the supply pipe 11. The cathode gas supplied to the FC 4 is discharged through the discharge pipe 12. The intercooler 16 cools the cathode gas to be supplied to the FC 4. The back pressure valve 17 adjusts a back pressure on the cathode side of the FC 4. Driving of each of the air compressor 14, the bypass valve 15, and the back pressure valve 17 is controlled by the ECU 3.

During normal power generation of the FC4, the cathode gas from the air compressor 14 is controlled to be in a supply state in which the cathode gas is supplied to the FC 4 by adjusting opening degrees of the bypass valve 15 and the back pressure valve 17. In the supply state, the bypass valve 15 communicates at least the upstream side and the downstream side of the supply pipe 11 from the bypass valve 15, and the back pressure valve 17 adjusts at least the discharge pipe 12 to be in an open state excluding a fully closed state. In addition, as will be described in detail later, in a state in which power generation of the FC 4 is paused, the cathode gas is controlled to be in a bypass state of bypassing the FC 4, by using the bypass valve 15 and the back pressure valve 17, so as not to be supplied to the FC 4 but to be discharged to the outside. In the bypass state, while the back pressure valve 17 fully closes the discharge pipe 12, and the bypass valve 15 communicates the upstream side of the supply pipe 11 from the bypass valve 15 and the bypass pipe 13 with each other while blocking the upstream side and the downstream side of the supply pipe 11 from the bypass valve 15. Thus, the bypass valve 15 is an example of a switching mechanism that can switch the commutation state from the supply state to the bypass state.

The anode gas supply system 20 supplies hydrogen gas as the anode gas to the FC4, and includes: a tank 20T; a supply pipe 21; a discharge pipe 22; a circulation pipe 23; a tank valve 24; a pressure regulating valve 25; an injector (hereinafter, referred to as an INJ) 26; a gas-liquid separator 27; a drain valve 28; and a hydrogen circulation pump (hereinafter, referred to as an HP) 29. The anode inlet manifolds of the tank 20T and the FC 4 are connected by a supply pipe 21. The tank 20T stores hydrogen gas that is the anode gas. The discharge pipe 22 is connected to an anode outlet manifold of the FC 4. The circulation pipe 23 communicates the gas-liquid separator 27 and the supply pipe 21 with each other. The tank valve 24, the pressure regulating valve 25, and the INJ 26 are arranged in this order from the upstream side of the supply pipe 21. With the tank valve 24 open, the opening degree of the pressure regulating valve 25 is adjusted, and the INJ 26 injects the anode gas. Thereby, the anode gas is supplied to the FC 4. The gas-liquid separator 27 and the drain valve 28 are disposed on the discharge pipe 22 in this order from the upstream side. The gas-liquid separator 27 separates moisture from the anode gas discharged from the FC 4 and stores this moisture. The water stored in the gas-liquid separator 27 is discharged to the outside of the fuel cell system 1 through the discharge pipe 22 when the drain valve 28 is opened. The circulation pipe 23 is a pipe for refluxing the anode gas to the FC4, an upstream end of the circulation pipe 23 is connected to the gas-liquid separator 27, and the circulation pipe 23 is provided with an HP 29. The anode gas discharged from the FC 4 is appropriately pressurized by the HP 29 to be guided to the supply pipe 21. Driving of each of the tank valve 24, the pressure regulating valve 25, the INJ 26, the drain valve 28, and the HP 29 is controlled by the ECU 3.

The power control system 30 controls discharge of the FC 4 and charge-discharge of the BAT 8. The power control system 30 includes: a fuel cell DC-DC converter (hereinafter, referred to as an FDC) 32; a battery DC-DC converter (hereinafter, referred to as a BDC) 34; a motor inverter (hereinafter, referred to as an MINV) 38; and an auxiliary inverter (hereinafter, referred to as an AINV) 39. The FDC 32 controls output current by the FC 4 based on a request current value transmitted from the ECU 3, and also adjusts direct-current power from the FC4 and outputs this to the MINV 38 and the AINV 39. The BDC 34 adjusts direct-current power from the BAT 8 and outputs this to the MINV 38 and the AINV 39. The power generated by FC 4 can be stored in BAT 8. The MINV 38 converts the input direct-current power into three-phase AC power and supplies this to the motor 50. The motor 50 drives the wheels 5 to drive the vehicle. The motor 50 functions as a power generator that generates electricity based on kinetic energy input from the wheels 5 when the vehicle is decelerated or runs on a slope. The power of the FC 4 and BAT 8 can be supplied to a load device other than the motor 50 via the AINV 39. Here, the load device includes, in addition to the motor 50, auxiliary equipment for the FC 4 and auxiliary equipment for the vehicle. The auxiliary equipment for the FC 4 includes: the air compressor 14; the bypass valve 15; the back pressure valve 17; the tank valve 24; the pressure regulating valve 25; the INJ 26; the drain valve 28; and the HP 29, which are all described above. The auxiliary equipment for the vehicle includes: air conditioning equipment, a lighting device, hazard lamps, etc., for example.

The cooling system 40 cools the FC 4 by circulating the cooling water through a predetermined passage, and includes: a supply pipe 41; a discharge pipe 42; a bypass pipe 43; a radiator 44; a bypass valve 45; and a water pump (hereinafter, referred to as a WP) 46. The supply pipe 41 is connected to a cooling water inlet manifold of the FC 4. The discharge pipe 42 is connected to a cooling water outlet manifold of the FC 4. The bypass pipe 43 communicates the supply pipe 41 and the discharge pipe 42 with each other. The bypass valve 45 is provided at a connection part between the supply pipe 41 and the bypass pipe 43. The bypass valve 45 switches the communication state between the supply pipe 41 and the bypass pipe 43. The radiator 44 is connected to the supply pipe 41 and the discharge pipe 42. The bypass valve 45 and the WP 46 are disposed on the supply pipe 41 in this order from the upstream side. The WP 46 circulates the cooling water as a coolant between the FC 4 and the radiator 44 via the supply pipe 41 and the discharge pipe 42. The radiator 44 cools the cooling water discharged from the FC 4 through heat-exchange with the outside air. Driving of each of the bypass valve 45 and the WP 46 is controlled by the ECU 3.

The ECU 3 includes: a CPU (central processing unit); a ROM (read only memory); and a RAM (random access memory). The accelerator opening sensor 6; an ignition switch 7; the air compressor 14; the bypass valves 15, 45; the back pressure valve 17; the tank valve 24; the pressure regulating valve 25; the INJ 26; the drain valve 28; the HP 29; the FDC 32; the BDC 34; and the WP 46 are all electrically connected to the ECU 3. The ECU 3 calculates a request output to the FC 4, that is, an amount of electric power that the FC 4 is requested to output, based on the detection value of the accelerator opening sensor 6, the driving states of the auxiliary equipment for the vehicle and the auxiliary equipment for the FC4, the stored power of the BAT 8, etc. Further, the ECU 3 calculates a target current value of the FC 4 according to the request output to the FC4, and controls the FDC 32 while controlling the flow rate of the cathode gas and the flow rate of the anode gas supplied to the FC 4 by the air compressor 14 and the INJ 26 such that the output current value of the FC 4 becomes the target current value. The ECU 3 is an example of a control unit that executes recovery processing described later.

Further, the ECU 3 pauses or restarts power generation of the FC 4 according to the request output to the FC 4. The pause of the power generation of the FC 4 is realized as the ECU 3 sets the target current value to zero and controls the FDC 32 such that the current value swept from the FC 4 becomes zero, or as electrical connection between the FC 4 and the load device is blocked by a switch provided inside the FDC 32. Further, the restart of the power generation of the FC 4 is realized as the ECU 3 sets the target current value to a value greater than zero and controls the FDC 32 to set the current value swept from the FC 4 to a value greater than zero, or as the FC 4 and the load device are electrically connected to each other by the switch provided inside the FDC 32. In addition, the ECU 3 performs an intermittent operation and a regenerative operation described below.

Intermittent Operation

When the request output to the FC 4 becomes equal to or smaller than a predetermined value, the ECU 3 performs the intermittent operation that temporarily pauses the power generation of the FC 4 to maintain the open circuit voltage of the FC 4 within a target range. The case in which the request output to the FC 4 is equal to or smaller than a predetermined value includes such a case, for example, in which the vehicle is stopped and electric power amount requested by the auxiliary equipment for the vehicle is small. In the intermittent operation, specifically, the anode gas is sufficiently supplied to the FC4, and supply of the anode gas is then stopped so as to adjust the flow rate of the cathode gas supplied to the FC 4 in such a manner that oxygen concentration at the cathode electrode of the FC 4 becomes lower than that during the normal power generation. In this state, a so-called cross leak causes the oxygen concentration at the cathode electrode of the FC 4 to become gradually lowered with time, and open circuit voltage of the FC 4 is also gradually lowered. The cross leak is a phenomenon in which hydrogen permeates through an electrolyte membrane from the anode side to the cathode electrode side, and whereby hydrogen and oxygen react with each other on the cathode electrode side to generate water, and thus the oxygen concentration on the cathode electrode side is lowered. When the oxygen concentration on the cathode electrode side is lowered, the open circuit voltage of the FC 4 is lowered. When the open circuit voltage is equal to or smaller than a lower limit value of the target range, the flow rate of the cathode gas supplied to the FC 4 is increased; therefore, the oxygen concentration at the cathode electrode of the FC 4 is increased, and thus the open circuit voltage is also increased. When the open circuit voltage becomes equal to or greater than an upper limit value of the target range, the flow rate of the cathode gas supplied to the FC 4 is decreased again, and the open circuit voltage of the FC 4 is thus lowered.

As described above, through the repetitive switching between increase and decrease of the flow rate of the cathode gas to the FC 4, the open circuit voltage of the FC 4 is converged within the target range. Thus, the magnitude of the open circuit voltage of the FC 4 is proportional to the oxygen concentration at the cathode electrode in the FC 4. Hence, the oxygen concentration at the cathode electrode in the FC 4 can be maintained within a predetermined range by maintaining the open-circuit voltage within the target range in a state in which the power generation is paused; therefore, when the request output is increased to a predetermined value or greater and the power generation of the FC 4 is restarted, the output of the FC 4 can be immediately increased.

Note that the target flow rate of the cathode gas when the open circuit voltage is equal to or greater than the upper limit value of the target range is set to a relatively low flow rate at which the open circuit voltage does not become increased even if the cross leakage is taken into account. This is because the rate of decrease in oxygen concentration due to the cross leak varies depending on the usage environment and the usage time of the FC 4, which makes it difficult to assume this rate of decrease in advance. Further, the target flow rate of the cathode gas when the open circuit voltage is equal to or smaller than the lower limit value of the target range is set to a flow rate at which the open circuit voltage becomes increased even if the decrease in oxygen concentration due to the cross leak is taken into account. In the present embodiment, the target flow rate of the cathode gas, which is set when the open circuit voltage becomes equal to or greater than the upper limit value of the target range, is zero; however, the present disclosure is not limited to this, and any flow rate may be adopted as far as the open circuit voltage is lowered at this flow rate.

The switching of the flow rate of the cathode gas is controlled by adjusting the opening degree of the bypass valve 15 and the opening degree of the back pressure valve 17 as described above. For example, in order to switch the flow rate of the cathode gas to zero, it is controlled to set the communication state to the above-described bypass state while the air compressor 14 is maintained to rotate at a minimum rotation speed. In order to increase the flow rate of the cathode gas, the back pressure valve 17 opens the discharge pipe 12, and the upstream side and the downstream side of the supply pipe 11 from the bypass valve 15 are allowed to communicate with each other by the bypass valve 15. The control on the flow rate of the cathode gas is not limited to this, and for example, in a supply state in which the cathode gas can be supplied to the FC 4, the flow rate of the cathode gas to the FC 4 may be controlled to zero by stopping the driving of the air compressor 14. During the intermittent operation, the supply of the anode gas is stopped in a state in which the FC 4 is sufficiently filled with the anode gas.

Regenerative Operation

When the vehicle is decelerated or runs on a slope, the ECU 3 controls the motor 50 to operate as the power generator to obtain braking force on the vehicle and charges the BAT 8 with at least part of generated regenerative power. Here, when the regenerative power is equal to or greater than a predetermined value, in a state in which the power generation of the FC 4 is temporarily paused and the flow rate of the cathode gas supplied to the FC 4 is limited, the ECU 3 executes the regenerative operation that consumes at least part of the regenerative power by driving of the air compressor 14. Specifically, as described above, the opening degree of the bypass valve 15 and the opening degree of the back pressure valve 17 are controlled such that the cathode gas is discharged to the outside without being supplied to the FC 4, and the rotational speed of the air compressor 14 is set at a maximum rotational speed. Accordingly, surplus electric power is consumed by the air compressor 14, and thus it is possible to prevent overcharge of the BAT 8 resulting from excessively great regenerative electric power with which the BAT 8 is charged. Even during the regenerative operation, the power generation of the FC 4 is paused and the cathode gas is not supplied; therefore, the open circuit voltage is gradually lowered due to the above-described cross leak.

Recovery Processing

The ECU 3 is capable of executing the recovery processing for recovering the FC 4 from deterioration of power generation performance of the FC 4 due to deterioration of performance of the catalyst. The recovery processing is functionally realized by the CPU, the ROM, and the RAM of the ECU 3. The recovery processing is processing that lowers the voltage of the FC 4 to a target value that is a voltage value at which the electrode catalyst of the FC 4 undergoes a reduction reaction so as to remove poisonous substances and oxide films adhering to the catalyst of the FC 4, to thereby recover the power generation performance of the FC 4. As will be described later in detail, in the recovery processing, the flow rate of the cathode gas supplied to the FC 4 is limited as well as the voltage of the FC 4 is lowered to the target value.

IV Characteristics

The ECU 3 can change current-voltage characteristics (hereinafter, referred to as IV characteristics) of the FC 4 by controlling the flow rate of the cathode gas supplied to the FC 4. Specifically, the cathode stoichiometric ratio can be changed by changing the flow rate of the cathode gas supplied to the FC 4, and as a result, the IV characteristics of the FC 4 can be changed. The "stoichiometric ratio" indicates a ratio of amount of a reactive gas to be supplied relative to theoretical amount of a reactive gas based on the requested power generation amount. In the normal power generation condition, the flow rate of the cathode gas and the flow rate of the anode gas are adjusted such that both the cathode stoichiometric ratio and the anode stoichiometric ratio are sufficiently high, to thereby perform the power generation with high efficiency. The flow rate of the anode gas is controlled to maintain the anode stoichiometric ratio at a sufficiently high level regardless of the magnitude of the cathode stoichiometric ratio so as not to cause so-called hydrogen shortage.

Figure 2:
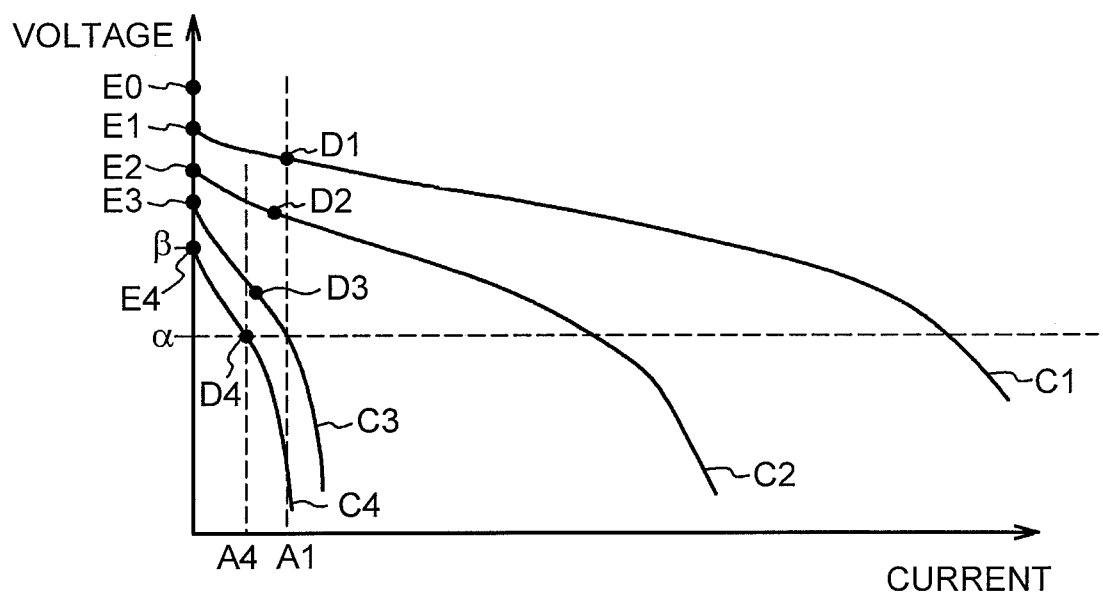
FIG. 2 is a graph showing an IV curve of a fuel cell.
Figure 3A:
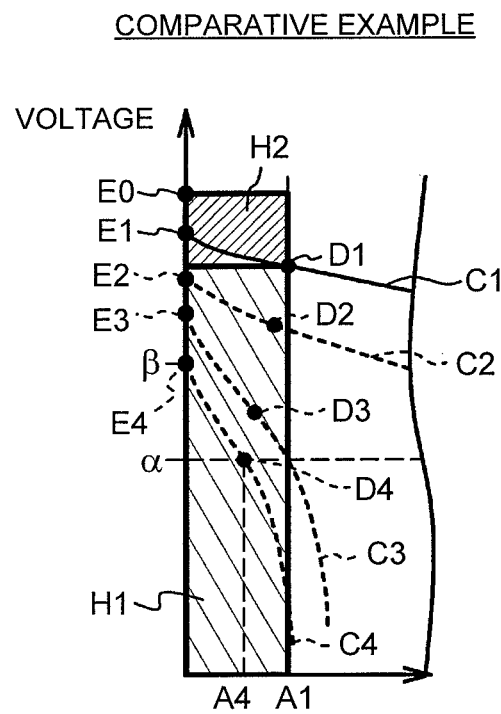
FIG. 3A is an explanatory diagram of recovery processing of a comparative example.
Figure 3B:
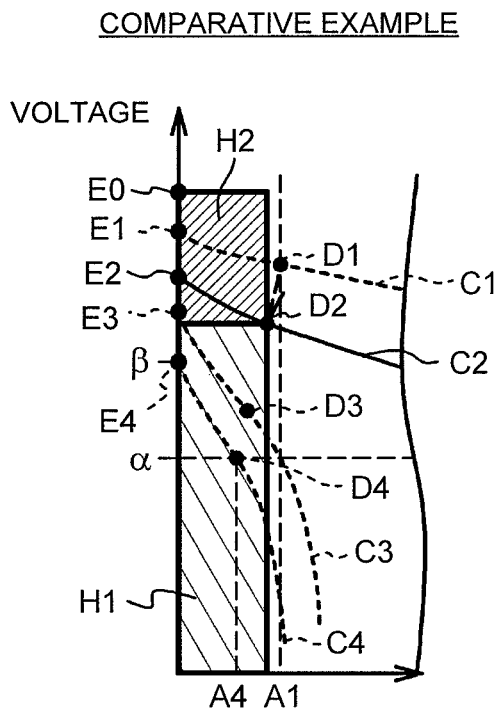
FIG. 3B is an explanatory diagram of recovery processing of a comparative example.
Figure 3C:
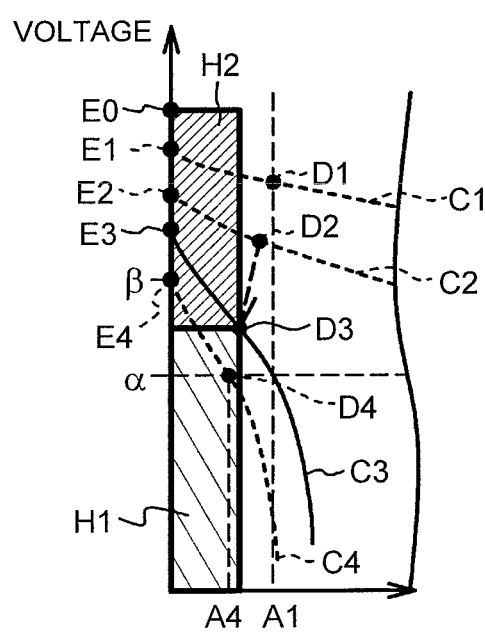
FIG. 3C is an explanatory diagram of recovery processing of a comparative example.
Figure 3D:
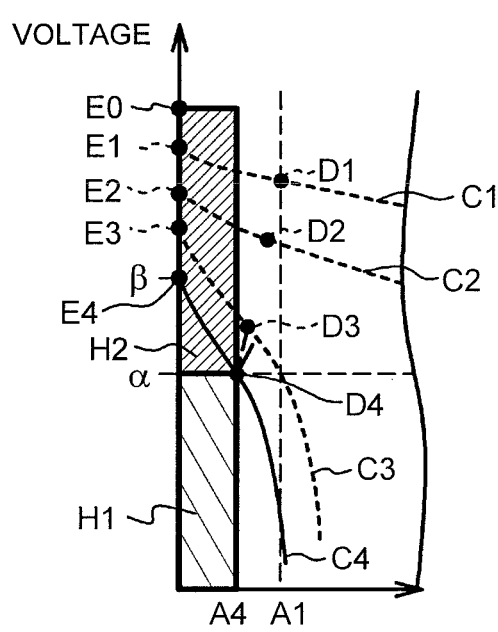
FIG. 3D is an explanatory diagram of recovery processing of a comparative example.

FIG. 2 is a graph showing IV curves C1 to C4 of the FC 4. In the order from the IV curve C1 to the IV curve C4, the IV curves in a case in which only the cathode stoichiometric ratio is lowered while the anode stoichiometric ratio is sufficiently high; and the power generation efficiency is lowered in this order. The IV curve C1 indicates an IV curve in a state of having a sufficiently high cathode stoichiometric ratio, and exhibits IV characteristic of the FC 4 in the normal power generation condition. In addition, FIG. 2 shows operating points D1 to D4 and E1 to E4, a theoretical electromotive voltage E0, a target value α, a threshold value β, an idle current value A1, and a current value A4. Note that the shift of the operating points of the FC 4 shown in the graph is realized by control by the ECU 3 on the flow rate of the anode gas supplied to the FC 4 within a range where no hydrogen shortage occurs, while control by the ECU 3 on the flow rate of the cathode gas supplied to the FC 4, and also control on the FDC 32 such that a sweep current value from the FC 4 reaches the target current value.

The operating points D1 to D4 are respective operating points on the IV curve C1 to the IV curve C4. The theoretical electromotive voltage E0 of the FC 4 is obtained by multiplying the theoretical electromotive voltage of a single cell by the number of stacked single cells of the FC 4. The operating points E1 to E4 are operating points at which the current becomes zero on the respective IV curves C1 to C4. The target value α is a target value for the above-described recovery processing. The threshold value β is an open circuit voltage value at the operating point E4, and is a higher value than the target value α. The threshold value β is a value smaller than the open-circuit voltage value at the operating point E1 on the IV curve C1 indicating the IV characteristics in the normal power generation condition. For example, the threshold value β is set to a value obtained by multiplying 0.6 V by the number of stacked single cells of the FC 4. The idle current value A1 is an output current value while the FC 4 is in an idle operation state. The current value A4 is a current value when the voltage reaches the target value α on the IV curve C4. The current value A4 is a value smaller than the idle current value A1.

The idle operation state is a state, for example, in which the vehicle is temporarily stopped, and the FC 4 generates only power equivalent to power consumed by the auxiliary equipment for the FC 4, which is minimum necessary to continue the power generation of the FC 4. The operating point D1 indicates an operating point on the IV curve C1 in the idling operation state. The operating point D4 indicates an operating point on the IV curve C4 when the voltage reaches the target value α. The operating points D2 and D3 will be described later.

As shown in FIG. 2, the output voltage is lowered as the output current of the FC 4 is increased. Here, the power generation amount of the FC 4 can be obtained by multiplying the output current value of the FC 4 by the output voltage value; and in general, the power generation amount is increased as the output current is increased. For example, when the power generation efficiency of the FC 4 is high as indicated by the IV curve C1, in order to lower the output voltage of the FC 4 to the target value α in the recovery processing, it is necessary to greatly increase the output current of the FC 4, that is, the output power of the FC 4 is required to be greatly increased. However, for example, as shown by C4, when the power generation efficiency of the FC 4 is low, in order to lower the output voltage of the FC 4 to the target value α, only small output current is required for the FC 4, that is, it is unnecessary to greatly increase the output power of the FC 4. Therefore, for example, when the request output to the FC 4 is small, by executing the recovery processing while lowering the power generation efficiency, it is possible to reduce increase in power generation amount of the FC 4 due to the execution of the recovery processing, to thereby prevent increase in surplus power as well as prevent the FC 4 from having a higher temperature. In the comparative example described below, while the power generation efficiency of the FC 4 is lowered, the recovery processing is executed by shifting the operating point in the order from the operating points D1, D2, D3 to D4.

Recovery Processing in Comparative Example

FIG. 3A, FIG. 3B, FIG. 3C, and FIG. 3D are explanatory diagrams of the recovery processing in the comparative example. In the recovery processing of the comparative example, from the operating point D1 in the idle operation state, the flow rate of the cathode gas is decreased while the power generation of the FC 4 is continued, to thereby lower the cathode stoichiometric ratio, and thus the operating point is shifted in the order from D2, D3 to D4. The sweep current value is gradually decreased from the idle current value A1 to the current value A4. Each of FIG. 3A to FIG. 3D shows a power generation amount H1 and a heat generation amount H2 of the FC 4 at the operating points D1 to D4. The power generation amount H1 at the operating point D1 can be obtained by multiplying the idle current value A1 and the voltage value at the operating point D1. The heat generation amount H2 at the operating point D1 can be obtained by multiplying a value, which is obtained by subtracting the voltage value at the operating point D1 from the theoretical electromotive voltage E0, by the current value at the operating point D1. Similarly, the power generation amount H1 at the operating point D2 can be obtained by multiplying the current value and the voltage value at the operating point D2. The heat generation amount H2 at the operating point D2 can be obtained by multiplying a value, which is obtained by subtracting the voltage value at the operating point D2 from the theoretical electromotive voltage E0, by the current value at the operating point D2. The power generation amount H1 at the operating point D3 can be obtained by multiplying the current value and the voltage value at the operating point D3. The heat generation amount H2 at the operating point D3 can be obtained by multiplying a value, which is obtained by subtracting the voltage value at the operating point D3 from the theoretical electromotive voltage E0, by the current value at the operating point D3. The power generation amount H1 at the operating point D4 can be obtained by multiplying the current value and the voltage value at the operating point D4. The heat generation amount H2 at the operating point D4 can be obtained by multiplying a value, which is obtained by subtracting the voltage value at the operating point D4 from the theoretical electromotive voltage E0, by the current value at the operating point D4.

In the recovery processing of the comparative example, since the FC 4 constantly generates power in the process of shifting from the operating point D1 to the operating point D4, the power generation amount H1 and the heat generation amount H2 are always generated. Hence, in the recovery processing of the comparative example, it is desired to further reduce surplus power and suppress the FC 4 from having a higher temperature.

Recovery Processing of Present Embodiment

FIG. 4A and FIG. 4B are explanatory diagrams of the recovery processing of the present embodiment. In the present embodiment, from the operating point E1 at which the power generation of the FC 4 is paused, the flow rate of the cathode gas supplied to the FC 4 is controlled so as to lower the IV characteristics, and then the power generation is restarted at the operating point E4 and the operating point is shifted to D4. The shift of the operating point from E1 to E4 can be realized by the above-described cross leak caused by decreasing the flow rate of the cathode gas while the power generation of the FC 4 is paused. Here, while the power generation of the FC 4 is paused, the power generation amount H1 and the heat generation amount H2 are naturally not generated. As shown in FIG. 4B, when the open circuit voltage of the FC 4 becomes equal to or smaller than the threshold value β at the operating point E4, the power generation of the FC 4 is restarted and the operating point is shifted from E4 to D4. In the recovery processing of the present embodiment, the power generation amount H1 and the heat generation amount H2 are generated at the operating point D4. Also in the present embodiment, the power generated by the execution of the recovery processing is stored in the BAT 8.

Here, the output current value A4 at the operating point D4 is smaller than the idle current value A1. That is, the output current value A4 of the FC 4, which corresponds to the target value α and is determined by the IV curve C4 corresponding to the threshold value β, is smaller than the idle current value A1. The threshold value β is previously determined based on experimental results such that the output current value is not greater than the idle current value A1 before the output voltage value reaches the target value α, as long as the flow rate of the cathode gas is not increased when the FC 4 power generation is restarted at the time point when the open circuit voltage reaches the threshold value β.

As described above, in the present embodiment, since the recovery processing is executed after the open circuit voltage is lowered to the threshold value β or less in a state in which the power generation of the FC 4 is paused, the power generation amount H1 and the heat generation amount H2 are more greatly decreased as compared with the case where the recovery processing is executed while the power generation is continued, as in the comparative example. Since the power generation amount H1 is small, it is possible to reduce surplus power caused by the execution of the recovery processing, and thus the BAT 8 can be suppressed from being overcharged when the BAT 8 is charged with the surplus power. Furthermore, since the heat generation amount H2 is also small, the FC 4 can be suppressed from having a higher temperature. In particular, while the vehicle is stopped, traveling wind does not hit the radiator 44, so that it is difficult to sufficiently lower the temperature of the cooling water of the FC 4; however, even in this case, it is possible to suppress the FC 4 from having a higher temperature.

Control Executed by ECU 3

Figure 5:
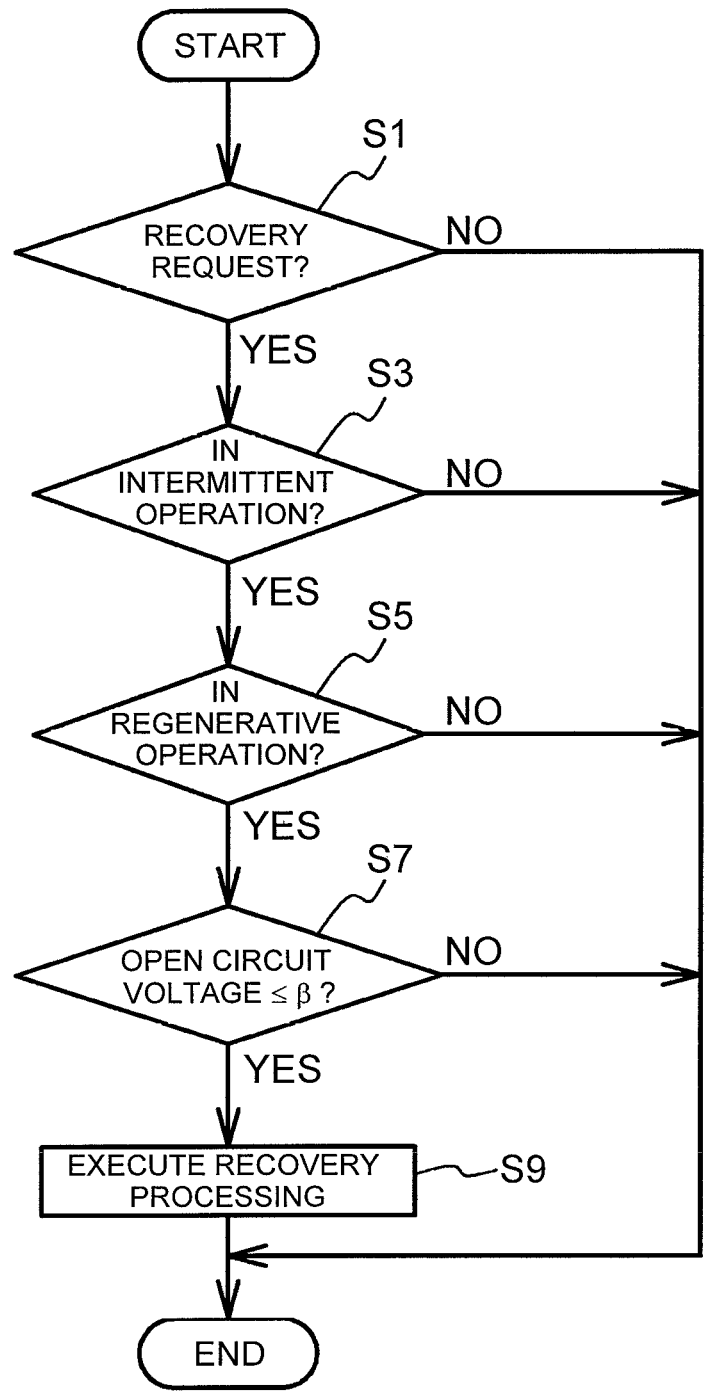
FIG. 5 is a flowchart illustrating an example of control of the present embodiment.

Next, the control executed by the ECU 3 will be specifically described. FIG. 5 is a flowchart showing an example of the control of the present embodiment. This control is repetitively executed. First, the ECU 3 determines whether or not there is an execution request of the recovery processing (hereinafter, referred to as a recovery request) (step S1). For example, it is determined that there is a recovery request if at least one of the following conditions is satisfied: when the voltage value at a predetermined current density of the FC 4 is smaller than the threshold value; when the elapsed time from the execution of the previous recovery processing is a predetermined time or longer; when the operation time of the FC 4 from the execution of the previous recovery processing is a predetermined time or longer, or when the vehicle travel distance from the execution of the previous recovery processing is a predetermined distance or more. In the case of No in step S1, this control is terminated.

In the case of Yes in step S1, the ECU 3 determines whether or not the intermittent operation is in progress (step S3). In the case of Yes in step S3, the ECU 3 determines whether or not the regenerative operation is in progress (step S5). In the case of No in step S3, the recovery processing is not executed and this control is thus terminated. In the case of No in step S5, the recovery processing is not executed and this control is thus terminated.

In the case of Yes in step S3 and in step S5, the ECU 3 determines whether or not the open circuit voltage of the FC 4 is equal to or smaller the threshold value β (step S7). The threshold value β is acquired in advance through an experiment and stored in the ROM of the ECU 3. In the case of No in step S7, this control is terminated. In the case of Yes in step S7, the ECU 3 executes the recovery processing (step S9). Specifically, the power generation of the FC 4 is restarted by the above-described method, and the sweep current value of the FC 4 is controlled to be the current value A4. As the voltage of the FC 4 becomes the target value α or smaller, the power generation performance of the FC 4 is restored. Note that after the completion of the recovery processing, the ECU 3 controls the power generation state of the FC 4 according to the requested operation state.

Both step S3 and step S5 are processing for determining whether or not the power generation of the FC 4 is paused. Therefore, in the case in which the power generation of the FC 4 can be controlled to be paused other than in the intermittent operation or the regenerative operation, it may be determined whether or not the power generation of the FC 4 is in a pause state, instead of step S3 and step S5.

Recovery Processing Executed During Intermittent Operation

Figure 6:
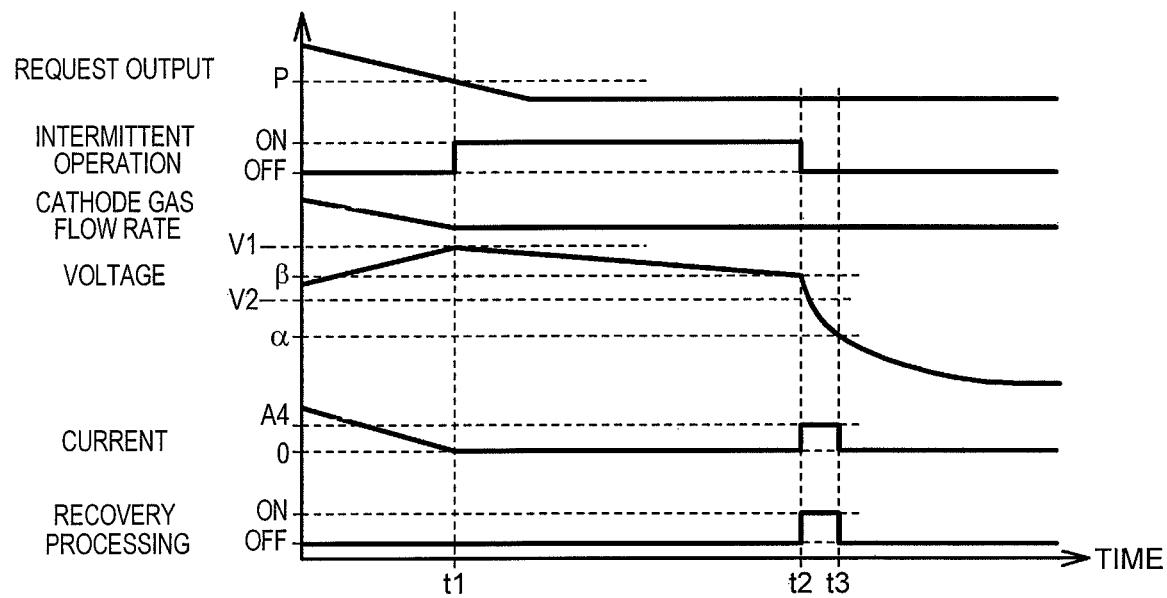
FIG. 6 is a timing chart when the recovery processing is executed during an intermittent operation.

FIG. 6 is a timing chart when the recovery processing is executed during the intermittent operation. FIG. 6 shows the request output to the FC 4, the execution state of the intermittent operation, the flow rate of the cathode gas supplied to the FC 4, the voltage and the current of the FC 4, and the execution state of the recovery processing. Further, FIG. 6 shows an upper limit value V1 and a lower limit value V2 of the target range of the open circuit voltage by the intermittent operation.

When the request output to the FC 4 starts to become decreased while the FC 4 is in the power generation state, the ECU 3 controls to gradually decrease the flow rate of the cathode gas supplied to the FC 4; thus, the output current of the FC 4 is decreased and the output voltage thereof is increased such that the output power of the FC 4 is decreased. When the request output to the FC 4 becomes a predetermined value β or smaller, the normal operation is switched to the intermittent operation (time t1).

Here, the above-described threshold value β is set to be a value smaller than the upper limit value V1 and greater than the lower limit value V2. Therefore, in the case of having a recovery request, before the open circuit voltage is lowered to the lower limit value V2, the open circuit voltage becomes equal to or smaller than the threshold value β, and thus the intermittent operation is temporarily paused, and the recovery processing is executed (time t2). When the recovery processing is executed, the power generation of the FC 4 is restarted while the flow rate of the cathode gas under control during the intermittent operation is limited to zero, so that the sweep current value of the FC 4 is controlled to be the current value A4, and whereby the output voltage is lowered to the target value α or smaller. When the output voltage reaches the target value α, the swept current value is controlled to be zero again, and the recovery processing is then completed (time t3). When the request output becomes greater than the predetermined value P after the completion of the recovery processing, the flow rate of the cathode gas is increased, to thus restart the power generation of the FC 4.

The example of FIG. 6 shows the case in which the open circuit voltage is not increased even when the current value is controlled to be zero after the completion of the recovery processing. This is because the oxygen concentration in the FC 4 is lowered because the oxygen in the FC 4 is consumed because of the execution of the recovery processing, that is, the restart of the power generation, so that the oxygen concentration is lower after the completion of the recovery processing than immediately before the start of the recovery processing, and thus the open circuit voltage does not become higher. Further, during the intermittent operation having no recovery request, the open circuit voltage is maintained between the upper limit value V1 and the lower limit value V2 regardless of the magnitude of relationship between the open circuit voltage and the threshold value β.

Recovery Processing Executed During Regenerative Operation

FIG. 7 is a timing chart when the recovery processing is executed during the regenerative operation. FIG. 7 shows the vehicle speed, the regenerative power generation amount, the execution state of the regenerative operation, the flow rate of the cathode gas supplied to the FC 4, the voltage and the current of the FC 4, and the execution state of the recovery processing.

For example, the vehicle speed is accelerated during running on a slope and the regenerative power generation amount of the motor 50 starts to be increased; although not shown in the drawing, the request output to the FC 4 is decreased, and the flow rate of the cathode gas supplied to the FC 4 is gradually decreased; and the output current of the FC 4 is decreased and the output voltage thereof is increased. When the regenerative power generation amount becomes greater than a threshold value G that is smaller by a predetermined margin than a charge limit value L at which the BAT 8 can be charged, the normal operation is switched to the regenerative operation (time t11). After switching to the regenerative operation, as described above, the cathode gas is switched to a state of not being supplied to the FC 4 by the bypass valve 15 and the back pressure valve 17, and the air compressor 14 is driven by the regenerative electric power of the motor 50. Thereby, the regenerative power can be consumed, so that the BAT 8 is suppressed from being charged with the regenerative power greater than the charge limit value L. Further, the cathode gas from the air compressor 14 is discharged to the outside without being supplied to the FC 4. Hence, the open circuit voltage is gradually lowered to be equal to or smaller than the threshold value β, and then the recovery processing is executed (time t12). Thereafter, when the open circuit voltage becomes equal to or smaller than the target value α, the recovery processing is completed (time t13). In this manner, the recovery processing is executed while the regenerative operation is continued.

Recovery Processing of First Modification

Next, a plurality of modifications of the recovery processing will be described. FIG. 8A and FIG. 8B are explanatory diagrams of the recovery processing of the first modification. FIG. 8A and FIG. 8B show a IV curve C5, operating points E5 and D5, a threshold value βa, and an output current value A5. The IV curve C5 is an IV curve whose power generation efficiency is further lowered than that of the IV curve C4. The operating point E5 indicates an operating point on the IV curve C5 when the output current value is zero. The operating point D5 indicates an operating point on the IV curve C5 when the output voltage becomes the target value α. The output current value A5 is an output current value defined based on the IV curve C5 and when the output voltage is equal to the target value α. The threshold value Pa is an open circuit voltage value at the operating point E5, and is a value smaller than the above-described threshold value β. In the first modification, after the operating point is shifted from E1 to E5 and the open circuit voltage is lowered to or lower than the threshold value βa, the power generation is restarted and the operating point is shifted to D5, and the recovery processing is executed. Accordingly, the power generation amount H1 and the heat generation amount H2 can be decreased more in the first modification than in the present embodiment.

Figure 9:
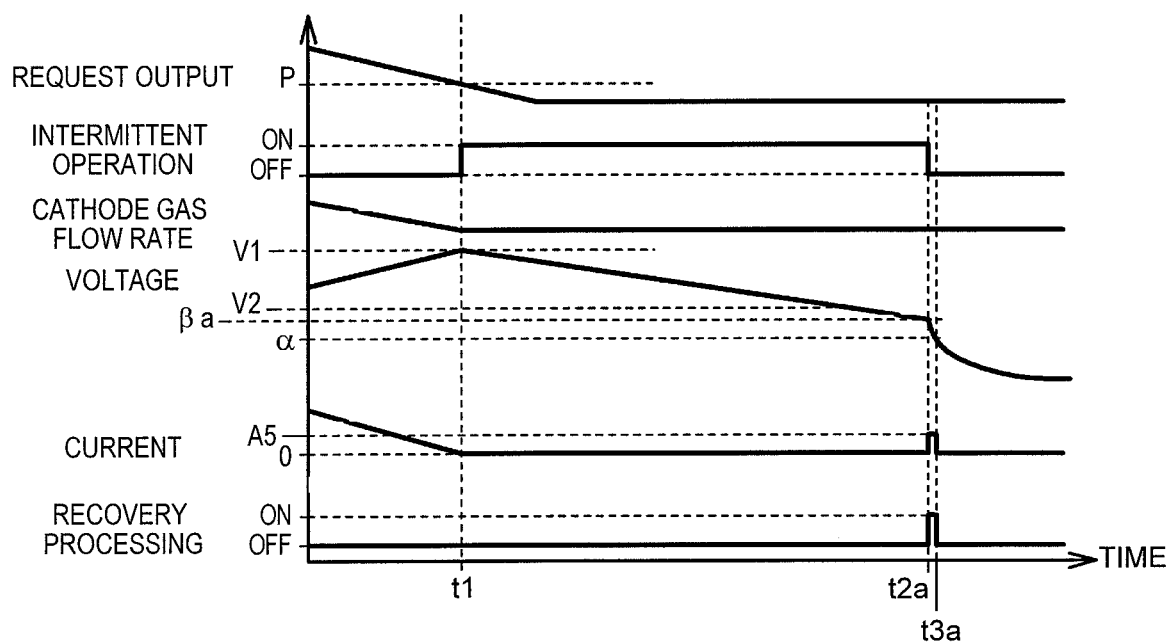
FIG. 9 shows a timing chart when the recovery processing of the first modification is executed during the intermittent operation.
Figure 10A:
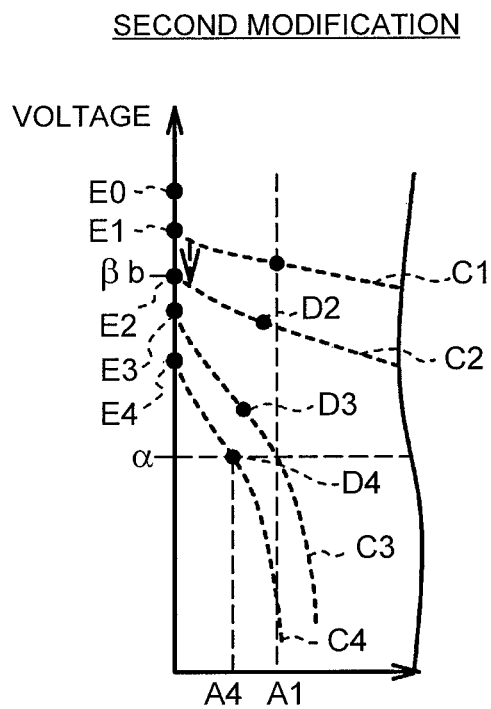
FIG. 10A is an explanatory view of recovery processing of a second modification.
Figure 10B:
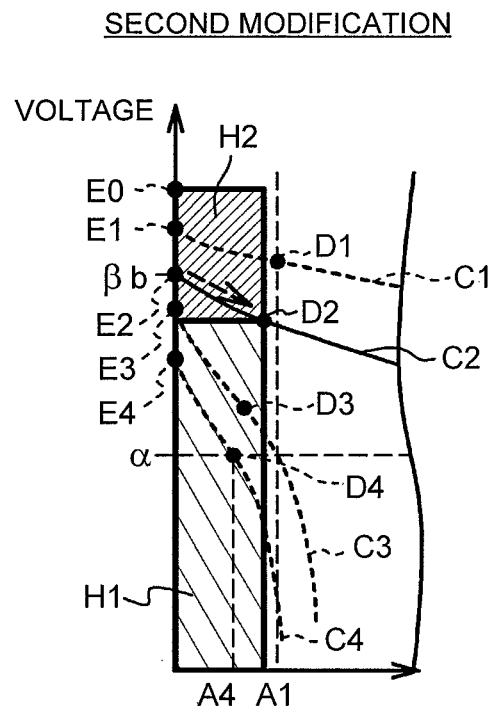
FIG. 10B is an explanatory view of the recovery processing of the second modification.
Figure 10C:
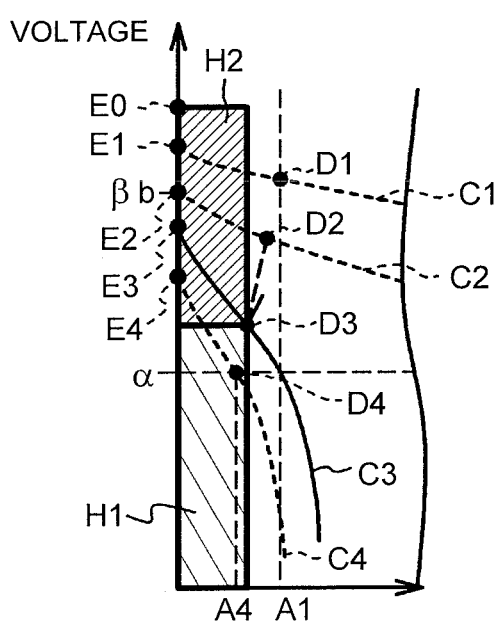
FIG. 10C is an explanatory view of the recovery processing of the second modification.
Figure 10D:
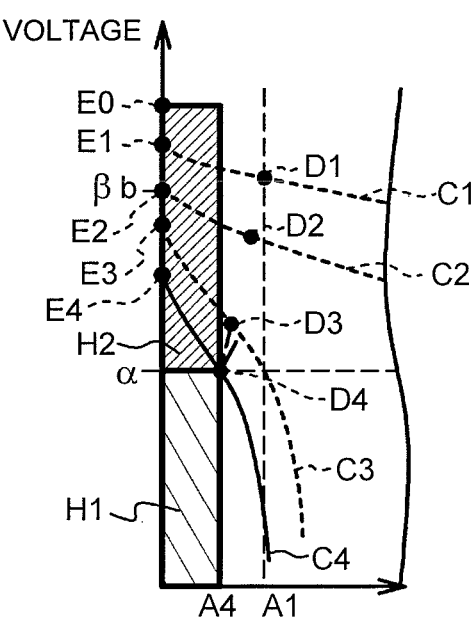
FIG. 10D is an explanatory view of the recovery processing of the second modification.

FIG. 9 shows a timing chart when the recovery processing of the first modification is executed during intermittent operation. The threshold value βa is set to be smaller than the lower limit value V2 of the target range of the open circuit voltage during the intermittent operation. When there is a recovery request, the flow rate of the cathode gas is not increased even when the open circuit voltage becomes the lower limit value V2 or smaller, and the recovery processing is executed when the open circuit voltage becomes the threshold value βa or smaller (time t2a). That is, after the oxygen concentration at the cathode electrode is sufficiently lowered, the power generation of the FC 4 is restarted and the recovery processing is executed. Therefore, the output voltage of the FC 4 drops to the target value α or smaller in a short period after the power generation is restarted, and the recovery processing is completed in a short period (time t3a).

Further, since the threshold value βa is equal to or smaller than the lower limit value V2, the lower limit value V2 may be set to be a higher value. By setting the lower limit value V2 to be a higher value, the open circuit voltage can be maintained at a relatively high value in the case of having no recovery request. Accordingly, it is possible to ensure responsiveness of the output of the FC 4 when the normal power generation is restarted.

In the first modification, the recovery processing is executed after the open circuit voltage is sufficiently lowered from the operating point E1 to the operating point E5. On the other hand, in the above-described present embodiment, as shown in FIG. 3A to FIG. 3D, the recovery processing is executed after the open circuit voltage is lowered from the operating point E1 to the operating point E4. Accordingly, although the power generation amount H1 and the heat generation amount H2 can be decreased more in the first modification than in the present embodiment, it takes more time until the power generation of the FC 4 is restarted, which means that it takes more time until the recovery processing is executed. Hence, considering and comparing the effect of decreasing the power generation amount H1 and the heat generation amount H2 as well as the period until the recovery processing is executed, it is preferable to appropriately determine a threshold value used for executing the recovery processing. Note that in FIG. 9, because of the space constraints, it is illustrated that the drop rate of the open circuit voltage due to the intermittent operation is greater than that in FIG. 6, but in practice, both are substantially the same.

Recovery Processing of Second Modification

Next, the recovery processing of the second modification will be described. FIG. 10A, FIG. 10B, FIG. 10C, and FIG. 10D are explanatory diagrams of the recovery processing of the second modification. In the second modification, the threshold value βb is set to be a value greater than the above-described threshold value β, and is set to be the same value as the value of the open circuit voltage at the operating point E2. In the second modification, the operating point is shifted in the order from E1, E2, D2, D3, to D4. The shift of the operating point from E2 to D2 can be realized by restarting the power generation of the FC 4 and increasing the sweep current to the FC 4 within a range less than the idle current value A1. The shift of the operating point from D2 to D4 can be realized by gradually decreasing the sweep current to the FC 4. Also in the second modification, since the IV characteristic is lowered while the power generation of the FC 4 is paused, the power generation amount H1 and the heat generation amount H2 can be more greatly decreased than in the comparative example shown in FIG. 3A to FIG. 3D.

Figure 11:
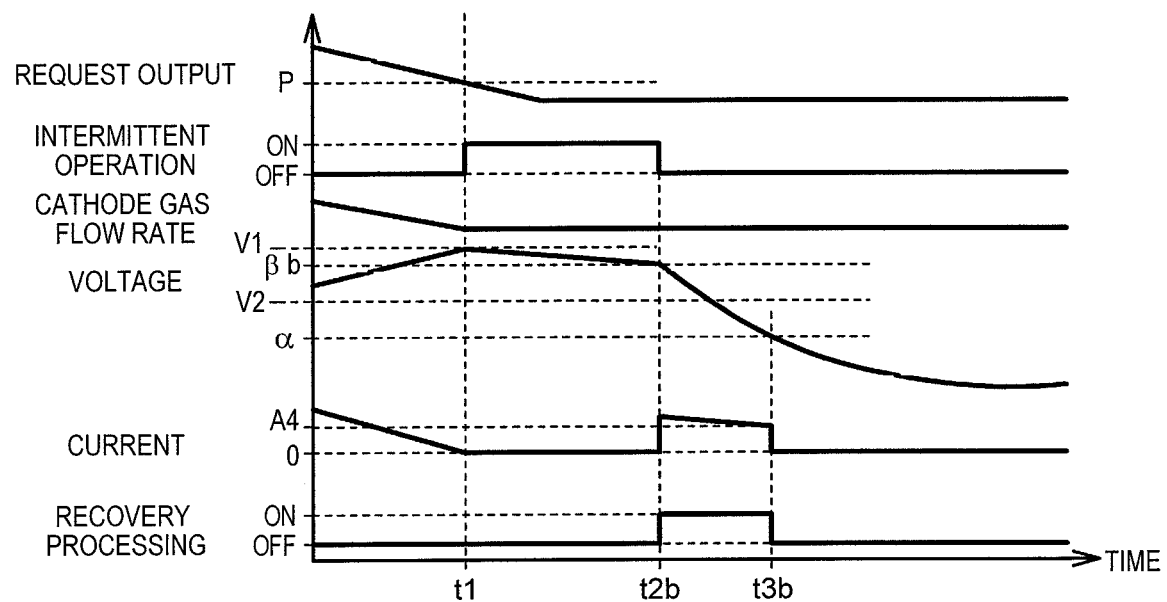
FIG. 11 is a timing chart when the recovery processing of the second modification is executed during the intermittent operation.

FIG. 11 is a timing chart when the recovery processing of the second modification is executed during the intermittent operation. The threshold value βb is the same as the above-described threshold value β in that this threshold value βb is smaller than the upper limit value V1 of the intermittent operation and greater than the lower limit value V2 of the intermittent operation, but the threshold value βb is a value closer to the upper limit value V1. Hence, the power generation of the FC 4 is restarted in a short period after the intermittent operation is executed and the recovery processing is then executed (time t2b), and whereby the output voltage can be lowered to the target value α (time t3b).

When the present embodiment shown in FIG. 4A and FIG. 4B is compared with the second modification, the power generation amount H1 and the heat generation amount H2 can be more greatly decreased in the present embodiment. However, when the flow rate of the cathode gas is limited under the same conditions, in the second modification, the time required for the shift of the operating point from E1 to D4 is shorter than the time required for the shift of the operating point from E1 to D4 in the recovery processing of the present embodiment. For example, the period from the time t1 to the time t3b shown in FIG. 11 is shorter than the period from the time t1 to the time t3 shown in FIG. 6. Both the present embodiment and the second modification have the same period for the shift of the operating point from E1 to E2, and the period for the shift of the operating point from E4 to D4 in the present embodiment can be considered to be substantially the same as the period for the shift of the operating point from E2 to D2 in the second modification. However, the drop of the voltage from the operating point D2 to the operating point D4 in the second modification is realized by consumption of oxygen in the cathode gas by the power generation of the FC 4. On the other hand, the drop of the open circuit voltage from the operating point E2 to the operating point E4 in the present embodiment is realized by consumption of oxygen due to the cross leak. Here, in general, the consumption rate of oxygen by the power generation is faster than the consumption rate of oxygen by the cross leak. Therefore, the effect of decreasing the power generation amount H1 and the heat generation amount H2 is smaller in the second modification than in the present embodiment, but the time until the recovery processing is completed can be more greatly shortened than that in the present embodiment. Accordingly, considering and comparing the effect of decreasing the power generation amount H1 to the heat generation amount H2 as well as the period until the recovery processing is completed, it is preferable to appropriately set a threshold value for executing the recovery processing.

Switching of Recovery Processing of Present Embodiment, First Modification, and Second Modification Depending on the situation, the recovery processing executed in each of the present embodiment, the first modification, and the second modification may be switched as appropriate. For example, as described above, the electric power of the FC 4 generated by the execution of the recovery processing is stored in the BAT 8; and when the remaining charge in the BAT 8 is smaller than a predetermined value, the recovery processing of the present embodiment may be executed, but when the remaining charge is equal to or greater than the predetermined value, the recovery processing of the first modification may be executed. In this manner, when the remaining charge in BAT 8 is relatively great, by executing the recovery processing of the first modification, amount of the power generation generated by the recovery processing may be further decreased so as to prevent overcharging of the BAT 8.

In addition, there may occur a case in which the request output to the FC 4 is increased to the predetermined value P or greater before the open circuit voltage becomes equal to or smaller than the threshold value β in a state of having a recovery request, so that the normal power generation is restarted but the recovery processing is not executed. If such a situation occurs repeatedly, the recovery processing of the second modification using the threshold value βb, which is greater than the threshold value β, may be executed. This configuration ensures an opportunity for executing the recovery processing. Specifically, the number of times that the intermittent operation and the regenerative operation are executed without executing the recovery processing in a state of having a recovery request may be counted, and the threshold value β may be used when the count value is smaller than a predetermined value, and the threshold value βb may be used when the count value is equal to or greater than the predetermined value. In addition, the time during which the recovery processing is not executed in a state of having a recovery request is measured, and the threshold value β may be used when the measured time is shorter than a predetermined time, and the threshold value βb may be used when the measured time is equal to or longer than the predetermined time.

Further, the threshold value βa may be used during the regenerative operation, and the threshold value β or βb may be used during the intermittent operation. During the regenerative operation, since reduction in surplus power due to the power generation by the FC 4 is desirable, and reduction in surplus power can be attained by executing the recovery processing of the present embodiment with a smaller power generation amount. In addition, there may be a case in which during the intermittent operation, depending on the driving operation by a driver, the request output to the FC 4 is increased to the predetermined value P or greater before the open circuit voltage becomes equal to the threshold value βa or smaller, and thus the normal power generation is restarted, which may make it impossible to ensure an opportunity for executing the recovery processing.

Other Remarks

In the present embodiment, the recovery processing can be executed in either of the intermittent operation and the regenerative operation, but the recovery processing may be executed only in any one of these operations.

Although the preferred embodiments of the present disclosure have been described in detail above, the present disclosure is not limited to such specific embodiments, and various modifications and changes can be made within the scope of the gist of the present disclosure as set forth in the claims.

What is claimed is:

1. A fuel cell system comprising:
a fuel cell;
a supply device configured to supply a cathode gas to the fuel cell and adjust a flow rate of the cathode gas supplied to the fuel cell; and
a control unit configured to lower output voltage of the fuel cell to a target value so as to execute recovery processing to recover power generation performance of the fuel cell, wherein:
the control unit is configured to, in a case of having an execution request of the recovery processing,
   i) restart power generation of the fuel cell when open circuit voltage of the fuel cell is lowered to or smaller than a threshold value higher than the target value by controlling the flow rate of the cathode gas while the power generation of the fuel cell is paused, and
   ii) execute the recovery processing while controlling an output current value of the fuel cell to be smaller than an idle current value that is an output current value of the fuel cell in an idle operation state.

2. The fuel cell system according to claim 1, wherein an output current value of the fuel cell is smaller than the idle current value, the output current value corresponding to the target value and determined by current-voltage characteristics of the fuel cell corresponding to the threshold value.

3. The fuel cell system according to claim 1, wherein the control unit is configured to execute the recovery processing by restarting power generation of the fuel cell so as to increase the output current value of the fuel cell within a range in which the output current value is smaller than the idle current value, and then decreasing the output current value.

4. The fuel cell system according to claim 1, wherein the control unit is configured to execute the recovery processing while limiting the flow rate of the cathode gas to or less than a flow rate of the cathode gas at which the open circuit voltage becomes lowered.

5. The fuel cell system according to claim 1, wherein the control unit is configured to execute the recovery processing while setting the flow rate of the cathode gas to zero.

6. The fuel cell system according to claim 1, wherein:
the control unit is configured to, when a request output to the fuel cell is equal to or smaller than a predetermined value, execute an intermittent operation for pausing the power generation of the fuel cell and controlling increase and decrease of the flow rate of the cathode gas so as to converge the open circuit voltage within a target range;
the threshold value is within the target range; and
the control unit is configured to, during the intermittent operation in a case of having the execution request of the recovery processing, stop the intermittent operation and execute the recovery processing when the open circuit voltage is lowered to or smaller than the threshold value.

7. The fuel cell system according to claim 1, wherein:
the control unit is configured to, when a request output to the fuel cell is equal to or smaller than a predetermined value, execute an intermittent operation for pausing the power generation of the fuel cell and controlling increase and decrease of the flow rate of the cathode gas so as to converge the open circuit voltage within a target range;
the threshold value is smaller than a lower limit value of the target range; and
during the intermittent operation in a case of having the execution request of the recovery processing, the control unit does not increase the flow rate of the cathode gas so as to increase the open circuit voltage even when the open circuit voltage is lowered to the lower limit value, and stops the intermittent operation and executes the recovery processing when the open circuit voltage is lowered to or smaller than the threshold value.

8. The fuel cell system according to claim 1, wherein
the fuel cell system is mounted in a vehicle;
the supply device includes a compressor configured to supply the cathode gas to the fuel cell, and a switching mechanism configured to switch a state from a supply state to a bypass state, the cathode gas being supplied from the compressor to the fuel cell in the supply state, the fuel cell being bypassed in the bypass state such that the cathode gas is not supplied to the fuel cell and discharged to an outside of the fuel cell; and
the control unit is configured to, when a regenerative power amount of a power generator mounted in the vehicle is equal to or greater than a predetermined value, execute a regenerative operation for switching the state from the supply state to the bypassing state and pausing the power generation of the fuel cell while consuming the regenerative power of the power generator by driving of the compressor, and
the control unit is configured to, during the regenerative operation in a case of having the execution request of the recovery processing, execute the recovery processing while continuing the regenerative operation when the open circuit voltage is lowered to or smaller than the threshold value.

* * * * *